United States Patent
Lee

(10) Patent No.: US 6,483,274 B2
(45) Date of Patent: Nov. 19, 2002

(54) DEVICE AND METHOD FOR DISPLAYING CHARGE CAPACITY INFORMATION OF SMART BATTERY

(75) Inventor: Chang-Hum Lee, Anyang (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 10/057,956

(22) Filed: Jan. 29, 2002

(65) Prior Publication Data

US 2002/0113575 A1 Aug. 22, 2002

(30) Foreign Application Priority Data

Feb. 16, 2001 (KR) .......................................... 2001-7912

(51) Int. Cl.[7] .......................... H02J 7/00; G01N 27/416
(52) U.S. Cl. ...................................... 320/132; 324/432
(58) Field of Search ................................ 320/132, 128, 320/107; 324/432

(56) References Cited

U.S. PATENT DOCUMENTS

| | | | |
|---|---|---|---|
| 4,709,202 A | 11/1987 | Koenck et al. | 320/112 |
| 5,955,869 A | 9/1999 | Rathmann | 320/132 |
| 6,025,698 A | 2/2000 | Kim et al. | 320/132 |
| 6,049,193 A * | 4/2000 | Chien | 320/132 |
| 6,078,871 A | 6/2000 | Anderson | 320/132 |
| 6,081,154 A | 6/2000 | Ezell et al. | 324/426 |
| 6,157,169 A | 12/2000 | Lee | 320/132 |
| 6,222,370 B1 | 4/2001 | Schousek et al. | 324/436 |
| 6,262,577 B1 | 7/2001 | Nakao et al. | 324/425 |
| 6,265,848 B1 | 7/2001 | Mukainakano | 320/132 |

* cited by examiner

Primary Examiner—Edward H. Tso
Assistant Examiner—Pia Tibbits
(74) Attorney, Agent, or Firm—Robert E. Bushnell, Esq.

(57) ABSTRACT

A device and a method for displaying an exact charge capacity of a smart battery includes a portable electric device including a control unit for power management. The portable electric device includes a battery for providing a relative state of charge (RSOC), a control unit for controlling the device to display battery residual capacity information by receiving the RSOC from the battery, and a display unit for displaying the battery residual capacity information. Here, the control unit detects an output voltage of the battery, compares the detected voltage with the RSOC, and controls the device to display the battery residual capacity information in response to data corresponding to the detected voltage, when the battery is in a period of a first low battery and the detected voltage is different from the RSOC, or controls the device to display the battery residual capacity information in response to the RSOC when the battery is in a period of a second low battery lower than the first low battery. Thus, the portable electric device can display the exact battery residual capacity information by correcting a period where an error is generated between the RSOC and the detected voltage.

15 Claims, 7 Drawing Sheets

DEVICE AND METHOD FOR DISPLAYING CHARGE CAPACITY INFORMATION OF SMART BATTERY

CLAIM OF PRIORITY

This application makes reference to, incorporates the same herein, and claims all benefits accruing under 35 U.S.C. §119 from an application entitled Apparatus and Method for Displaying Charge Capacity Information of smart Battery earlier filed in the Korean Industrial Property Office on Feb. 16, 2001, and there duly assigned Ser. No. 2001-7912 by that Office.

BACKGROUND OF THE INVENTION

1. Field of the Invention

The present invention generally relates to a device and a method for displaying residual capacity information of a smart battery, and more specifically, to a device and a method for exactly displaying an actual state of a residual battery capacity corresponding to a current battery level of a portable electronic device employing a smart battery.

2. Background of the Invention

Nowadays, rechargeable batteries are variously used for portable electronic devices such as portable computing systems, video cameras, and mobile phones. Those portable electronic devices include rechargeable batteries, e.g., smart batteries embedding microcontrollers therein. The microcontroller provides the portable electronic devices with various information items such as battery conditions, battery charge capacity, and a manufacturing company of the battery. Hence, the smart battery can provide information about its residual capacity to the portable electronic device so as to display a battery state relevant to the residual capacity of the battery.

There are various reasons to cause variations of residual capacity of a battery. For instance, when a user charges or discharges the battery with frequent times, or without full capacity, the charge capacity of the battery would be reduced.

As described above, while the smart battery has a function of offering the information on the residual amount of battery capacity, and it is required to exactly estimate the battery capacity changeable in accordance with various environmental elements in order to offer exact battery residual capacity information. Thus, the smart battery sets up a new reference capacity in accordance with the changes of battery capacity, and provides present residual capacity information based on the reference capacity. For the purpose of establishing the new reference capacity, the smart battery carries out calibration when an output voltage becomes lower than a predetermined level. The calibration is used for re-establishing the reference capacity of the battery with a measured value of a total charge capacity of a battery. During the calibration, a discharge starts from a full-charged state, and the amount discharged until the output voltage of the smart battery becomes lower than the predetermined voltage level is established as a reference capacity. In case that the battery continues to be discharged after the calibration, the reference capacity is set by performing a re-calibration after the former discharge is finished.

However, after a frequent charge or discharge, the smart battery may offer the battery residual capacity information having an error. A reason of erroneous information for residual capacity arises from an incorrect calibration not corresponding to an actual environment in use. In other words, since the calibration associated with a specific program, the residual capacity by the battery calibration is different from the actual residual capacity of the battery.

The foregoing drawbacks cause various problems in using the portable electronic device employing the smart battery because of wrong information for the battery residual capacity.

A process for displaying a battery residual capacity in a portable electronic device having the earlier smart battery is shown below. It is performed in a power management system installed in a portable computer.

The power management system of the portable computer system checks whether or not an alternating current (AC) adapter is installed. If there is no AC adapter, the system operates in a battery mode that provides a power source for the portable computer from the smart battery. Afterwards, the battery discharge starts, and battery information is received. In other words, the power management system detects a state of the battery by receiving battery relative state of charge (RSOC) from a microcontroller of the smart battery.

The power management system detects a state of low battery (LB) in which the battery residual capacity is reduced less than 10%, and displays a warning for a user through a liquid crystal display (LCD) panel. Then, if the smart battery continues to discharge, and thus a low low battery voltage is detected, i.e. if the battery residual capacity is reduced less than a predetermined amount, e.g., less than 3%, the power management system stores data by making an operating system (OS) program to protect current data at work. This case is called a low low battery (LLB) state. The OS program serves to support a power management function such as advanced power manager (APM) or advanced configuration and power interface (ACPI), and for instance, a WINDOWS type of OS (operating system) of the MICROSOFT Corporation belongs to the program. The OS program allows the data being processed of the present system to be stored in a hard disk drive, and after the operation, the power management system finishes the system by blocking the power source provided from the smart battery.

The battery discharge is stopped before the battery voltage gets to the level for the calibration, failing to carry out the calibration. In case the calibration is not accomplished, an accuracy of the data about the battery residual capacity is degraded. Further, even though the calibration is accomplished by the battery voltage getting to the calibration level, points of completing the discharge are respectively different, resulting in generating an error due to a re-calibration.

In general, a voltage level used for the calibration of the smart battery is present between LB and LLB. However, when a warning caused from LB is displayed, a general user connects the AC adapter to the portable computer system for charging the battery, or ceases using the system. Thus, the battery discharge is stopped before the battery voltage gets to the level for the calibration, failing to carry out the calibration. In case the calibration is not accomplished, an accuracy of the data about the battery residual capacity is degraded. Further, even though the calibration is accomplished by that the battery voltage gets to the calibration level, points of completing the discharge are respectively different, resulting in generating an error due to a re-calibration.

Like this, if it is impossible to correctly detect a state of LB or LLB because of the extreme difference in an accuracy for the battery residual capacity, the system may be turned off while the portable computer system is used, which may cause a loss of data. For instance, it is assumed that data value of the battery RSOC provided from the smart battery is more than LLB, even though the actual battery residual capacity is already less than LLB. Then the battery is fully discharged before an operation of save-to-disk is carried out, and the portable computer system is powered off. Thus, the data being processed may be lost. The portable computer system has a function to display the residual capacity of the smart battery in percentage for a user, but the error prevents the system from displaying the exact battery residual capacity for the user.

Exemplars of the art include U.S. Pat. No. 6,262,577 issued to Nakaoetal., for Method of Measuring Quantities Indicating State of Electrochemical Device and Apparatus for the Same, U.S. Pat. No. 6,222,370 issued to Schousek et al, for Universal Battery Monitor, U.S. Pat. No. 6,025,698 issued to Kim et al., for Smart Battery Charging System, Charging Method Therefor and Power Supply System for Portable Computer Using the Same, U.S. Pat. No. 4,709,202 issued to Koenck et al., for Battery Powered System, U.S. Pat. No. 6,081,154 issued to Ezell et al., for Circuit for Determining the Remaining Operating Life of a System, U.S. Pat. No. 6,078,871 issued to Anderson, for Method of Displaying a Status Condition of a Battery, U.S. Pat. No. 6,157,169 issued to Lee, for Monitoring Technique for Accurately Determining Residual Capacity of a Battery, U.S. Pat. No. 5,955,869 issued to Rathmann, for Battery Pack and a Method for Monitoring Remaining Capacity of a Battery Pack, and U.S. Pat. No. 6,265,848 issued to Mukainakano, for Battery State Monitoring Circuit and Battery Device.

SUMMARY OF THE INVENTION

It is, therefore, an object of the present invention to provide a device and a method for exactly displaying battery residual capacity information by detecting a difference between an actual residual capacity and a data value about residual capacity of a smart battery.

It is another object of the present invention to provide a device and a method for displaying a battery charge capacity by eliminating an error accompanied by residual capacities in stages of the battery relative state of charge.

It is yet another object to provide an inexpensive technique of accurately determining the battery charge capacity information.

It is still yet another object to provide a technique of determining the battery charge capacity information that is easy to implement.

In order to attain the above objects, according to an aspect of the present invention, there is provided a portable electronic device including a battery for providing a power source to the portable electric device, a control unit for controlling the device to display battery residual capacity information by receiving a relative state of charge (RSOC) from the battery, and a display unit for displaying the battery residual capacity information,where the control unit detects an output voltage of the battery, compares the detected voltage with the RSOC, and controls the device to display the battery residual capacity information in response to data corresponding to the detected voltage, when the battery is in a period of a first low battery and the detected voltage is different from the RSOC, or controls the device to display the battery residual capacity information in response to the RSOC when the battery is in a period of a second low battery lower than the first low battery.

In a preferred embodiment of the invention, the first low battery period is in a residual capacity state of 15~20% of full charge capacity of the battery, and the second low battery period is in a residual capacity state of 3~10% of the full charge capacity of the battery.

In the preferred embodiment of the invention, the control unit controls the device to store present data being processed, and to block the power source of the portable electronic device when the second low battery period is detected.

In the preferred embodiment of the invention, the control unit is formed of a microcontroller.

In the preferred embodiment of the invention, the control unit includes a function key for calling to display the battery residual capacity information, a microcontroller for receiving the RSOC from the battery, a basic input/output system (BIOS) for controlling and providing the RSOC to the microcontroller in response to the calling of the function key, and an operating system (OS) program for displaying the battery residual capacity information in response to the RSOC and a control provided from the microcontroller.

According to another aspect of this invention, there is provided a method for displaying battery residual capacity information of a portable electronic device including a battery, the method including the steps of receiving relative state of charge (RSOC) from the battery, identifying whether the battery is in a period of a first low battery from the RSOC, detecting a voltage of the battery when the battery is in the first low battery period, comparing the detected voltage with the RSOC, controlling the device to display the battery residual capacity information by using data corresponding to the detected voltage when the detected voltage is different with the RSOC, identifying whether the battery is in a period of a second low battery lower than the first low battery from the RSOC, and controlling the device to display the battery residual capacity information by using the RSOC when the battery is in the second low battery period.

In a preferred embodiment of the invention, the method further includes a step of controlling the device to store present data being processed of the portable electric device, and to block a power source of the portable electric device, when the battery is in the second low battery period.

As is apparent from the foregoing, the control unit displays exact battery residual capacity information in stages by correcting a variation between a relative state of charge (RSOC) and a detected voltage, in response to a low battery level or a low low battery level of the smart battery.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
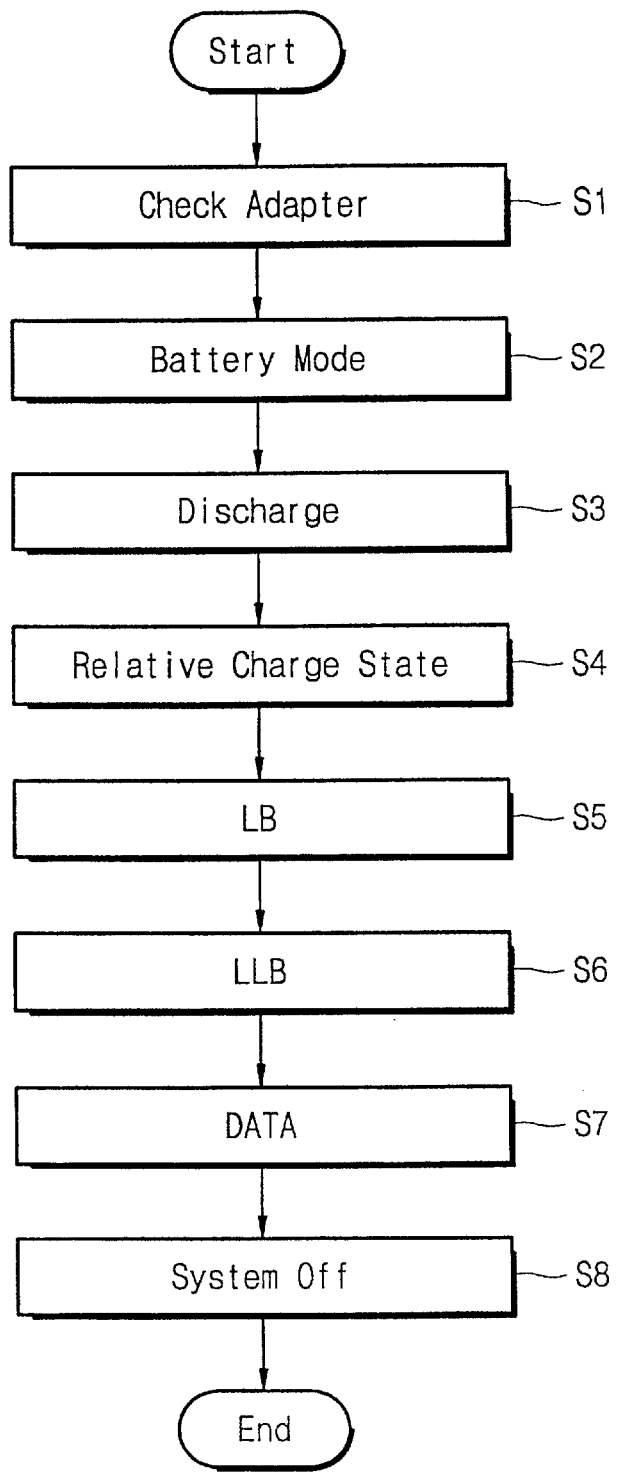
FIG. 1 is a flow chart illustrating a process for displaying residual capacity information of a general smart battery.

Turning now to the drawings, FIG. 1 shows a process for displaying a battery residual capacity in a portable electronic device having the general smart battery. It is performed in a power management system installed in a portable computer.

Referring to FIG. 1, the power management system of the portable computer system checks whether or not an alternating current (AC) adapter is installed at step S1. If there is no AC adapter, the portable computer system operates in a battery mode that provides a power source for the portable computer from the smart battery at step S2. Afterwards, the battery discharge starts at step S3, and battery information is received at step S4. In other words, the power management system detects a state of the battery by receiving the battery relative state of charge (RSOC) from a microcontroller of the smart battery.

At step S5, the power management system detects a state of low battery (LB) in which the battery residual capacity is reduced less than 10%, and displays a warning for a user through a liquid crystal display (LCD) panel. Then, at step S6, if the smart battery continues to discharge, a low low battery (LLB) voltage at step S6 is detected at step S7, i.e. if the battery residual capacity is reduced less than a predetermined amount, e.g., less than 3%, the power management system stores data by making an operating system (OS) program to protect current data at work. The case is called a low low battery (LLB) state. The OS program serves to support a power management function such as advanced power manager (APM) or advanced configuration and power interface (ACPI), and for instance, a WINDOW-type OS of MICROSOFT Co. belongs to the program. The OS program allows the data of present system being processed to be stored in a hard disk drive, and after the operation, the power management system turns off the system by blocking the power source provided from the smart battery at step S8.

Figure 2:
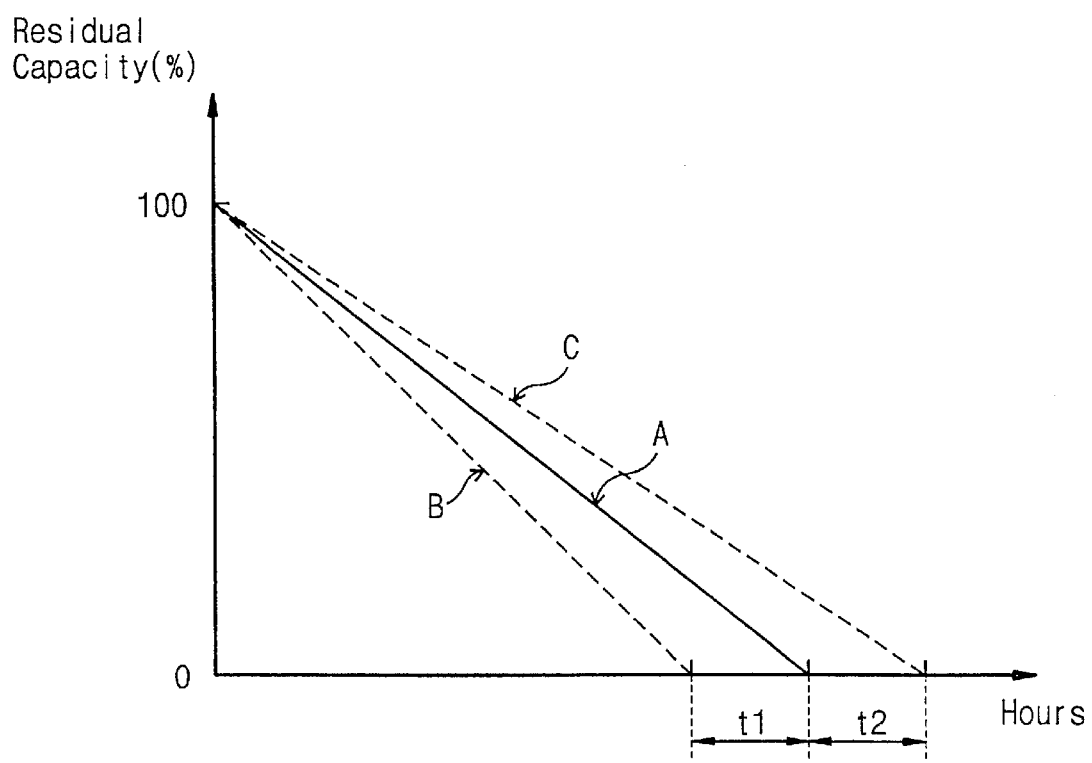
FIG. 2 is a graphic diagram illustrating a discharge characteristic according to the process shown in FIG. 1.

FIG. 2 shows a discharge curve according to the detected residual capacity and an actual residual capacity of the general smart battery. A discharge curve B indicating information of a capacity lower than an actual capacity degrades a using time of the battery due to an error as much as time t1, as compared with an actual discharge curve A. A discharge curve C indicating information of a capacity higher than the actual capacity may cause a loss of the data being processed due to an error as much as time t2, as compared with the actual discharge curve A.

In general, a voltage level used for the calibration of the smart battery is present between LB and LLB. However, when a warning caused from LB is displayed, a general user connects the AC adapter to the portable computer system for charging the battery, or ceases using the system. Thus, the battery discharge is stopped before the battery voltage gets to the level for the calibration, failing to carry out the calibration. In case the calibration is not accomplished, an accuracy of the data about the battery residual capacity is degraded. Further, even though the calibration is accomplished when the battery voltage gets to the calibration level, points of completing the discharge are respectively different, resulting in generating an error due to a re-calibration.

If it is impossible to rightly detect a state of LB or LLB because of the extreme difference in an accuracy for the battery residual capacity, the system may be turned off while the portable computer system is used, which may cause a loss of data. For instance, it is assumed that the data value of the battery RSOC provided from the smart battery is more than LLB, even though the actual battery residual capacity is already less than LLB. Then the battery is fully discharged before an operation of save-to-disk is carried out, and the portable computer system is powered off. Thus, the data being processed may be lost. The portable computer system has a function to display the residual capacity of the smart battery in percentage for a user, but the error prevents the system from displaying the exact battery residual capacity for the user.

It should be understood that the description of the preferred embodiment is merely illustrative and that it should not be taken in a limiting sense. In the following detailed description, several specific details are set forth in order to provide a thorough understanding of the present invention. It will be obvious, however, to one skilled in the art that the present invention may be practiced without these specific details.

Figure 3:
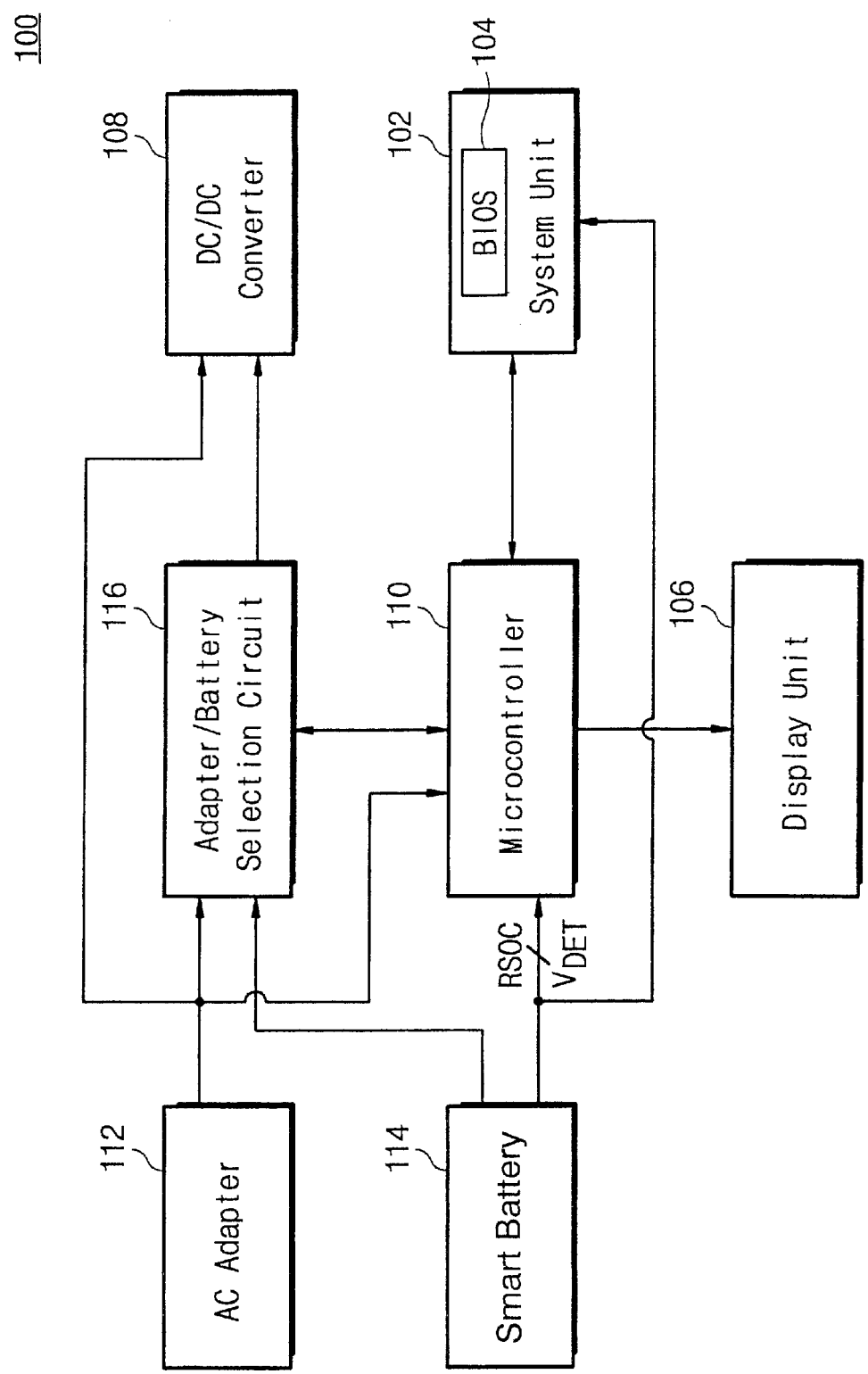
FIG. 3 is a block diagram illustrating a portable electronic device having a smart battery according to the first embodiment of the present invention.

FIG. 3 is a block diagram showing a portable electronic device having a smart battery according to a first embodiment of the present invention.

Referring to FIG. 3, the portable electronic device 100 such as a portable computer system includes a microcontroller 110. The portable electronic device 100 receives a power supply voltage from an alternative current (AC) adapter 112 or a smart battery 114. The portable electronic device includes an adapter/battery selection circuit 116, a direct current DC/DC converter 108, a display unit 106, and a system unit 102.

The adapter/battery selection circuit 116 selects a power source path to receive the power supply voltage from the AC adapter 112 or the smart battery 114, when the AC adapter 112 or the smart battery 114 are connected in response to a control of the microcontroller 110.

The DC/DC converter 108 receives the power supply voltage from the AC adapter 112 or the smart battery 114, and then provides the power supply voltages (for example, 12V, 5V, 3.3V, 2.7V, 2.5V, 1.9V, 1.6V, and 1.35V) required for respective units (for example, central processing unit (CPU), motherboard, hard disc drive, compact disc read-only memory (CD-ROM) drive, and smart battery) in the system unit 102.

The microcontroller 110, serving as a control unit to control a power management of the portable electronic device 100, receives a relative state of charge (RSOC) from the smart battery 114 and detects an output voltage $V_{DET}$ of the battery. If the detected voltage $V_{DET}$ is a specific voltage and is in a period of a low battery (LB) state, the RSOC and the detected voltage $V_{DET}$ are compared with each other. Afterwards, in the result of the comparison, in case that two information values RSOC and $V_{DET}$ are identical, the display unit 106 is controlled to display residual capacity information of the battery 114. However, if two information values RSOC and $V_{DET}$ are different, the display unit 106 is controlled to display a battery residual capacity information corresponding to the detected voltage $V_{DET}$.

Further, the microcontroller 110 identifies whether the detected voltage $V_{DET}$ is in the LB battery state period or a period of a low low battery (LLB) state. When the detected voltage $V_{DET}$ is in the LLB state period, the display unit 106 is controlled to display the battery residual capacity information by using the RSOC.

The system unit 102 includes various units such as the CPU (central processing unit), the motherboard, the hard disc drive, the CD-ROM drive, and the smart battery included in the portable electronic device 100, and has a basic input/output system (BIOS) for a power management.

The display unit 106, formed of, for example, a light emitting diode (LED) or a liquid crystal display (LCD), displays the battery residual capacity information of the smart battery 114 in response to a control of the microcontroller 110.

Thus, the microcontroller 110 identifies a battery state through the output voltage of the battery, and controls the device to exactly display the battery residual information by correcting an error between the output voltage $V_{DET}$ and the RSOC provided from the battery.

Figure 4:
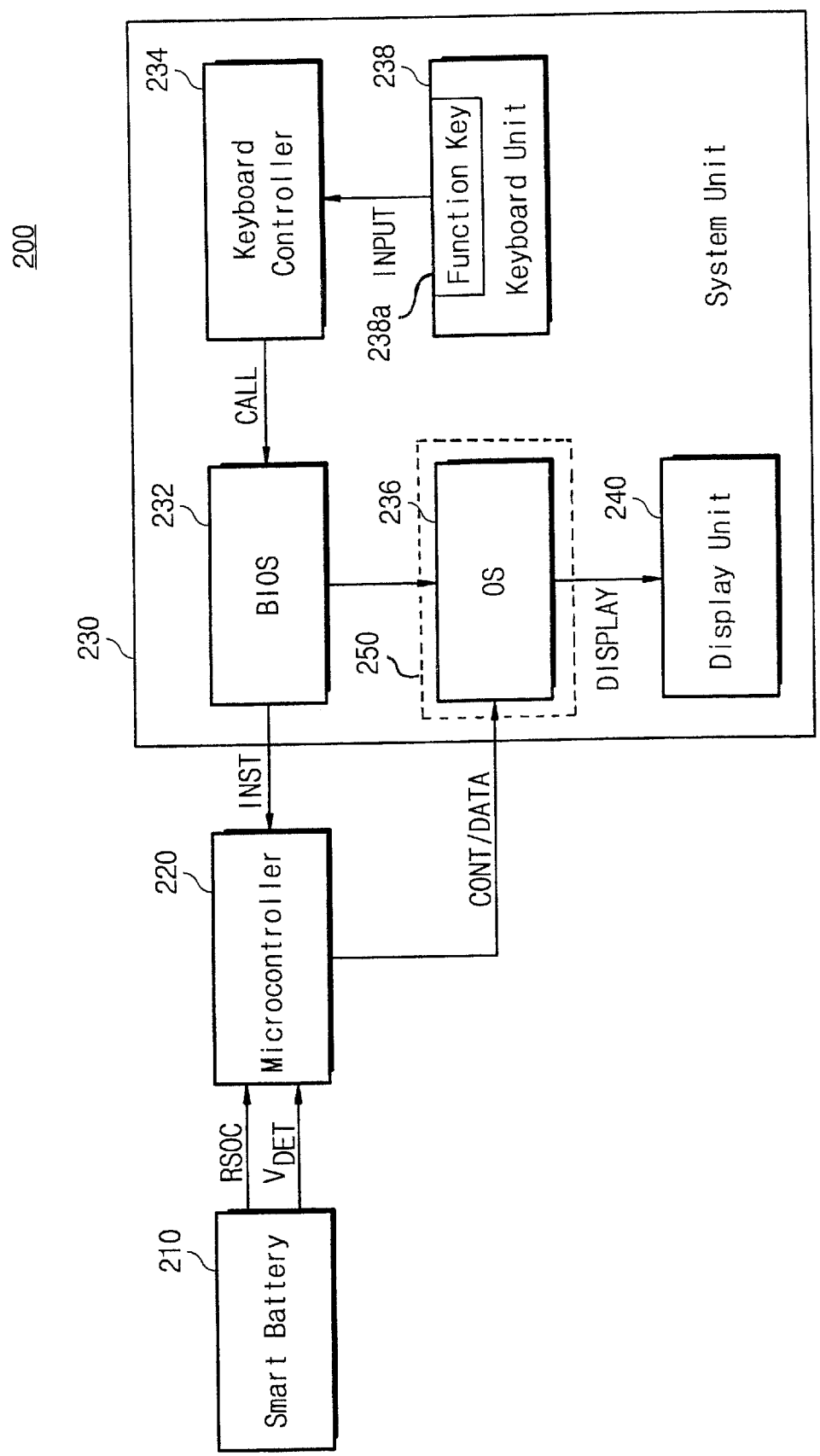
FIG. 4 is a block diagram illustrating a portable electronic device having a smart battery according to the second embodiment of the present invention.

FIG. 4 is a block diagram showing a portable electronic device including a smart battery according to a second embodiment of the present invention.

Referring to FIG. 4, the portable electronic device 200 includes a microcontroller 220, a keyboard unit 238, a keyboard controller 234, a BIOS 232, an operating system (OS) program 236, and a display unit 240. The portable electronic device 200 includes a smart battery 210. In the portable electronic device 200 such as a portable computer system, the AC adapter 112, the DC/DC converter 108, and the adapter/battery selection circuit 116 shown in FIG. 3 are omitted.

The keyboard unit 238 includes a function key 238a that calls to display battery residual capacity information. The keyboard controller 234 generates an interrupt signal CALL to the BIOS 232 in response to an input of the function key.

The BIOS 232 carries out a corresponding interrupt handler routine in response to the interrupt signal CALL. In other words, the BIOS 232 provides a command signal INST to display the battery residual capacity information to the microcontroller 220 in response to the interrupt signal CALL, and informs the OS program 236 included in a memory 250 of the call of the function key 238a.

The microcontroller 220 receives the RSOC of the smart battery 210 in response to the command signal INST of the BIOS 232, and detects a battery output voltage $V_{DET}$. In other words, the detected voltage $V_{DET}$ is a specific voltage and is in the LB state period, the RSOC and the detected voltage $V_{DET}$ are compared for each other. Afterwards, in the result of the comparison, in case that two information values RSOC and $V_{DET}$ are different, the RSOC for the detected voltage DATA and a control signal CONT are provided to the OS program 236 to display the battery residual capacity information corresponding to the detected voltage $V_{DET}$. Further, the microcontroller 220 identifies whether the detected voltage $V_{DET}$ is in the period of the LB state or the LLB state. Then, if the detected voltage $V_{DET}$ is in the LLB state period, the OS program 236 is controlled to display the battery residual capacity information by using the RSOC.

The OS program 236 recognizes the input of the function key through the information provided from the BIOS 232, and displays the battery residual capacity information on the display unit 240, e.g., on a part of the image of the LCD device of the portable computer system 200 in response to the RSOC for the detected voltage DATA and the control signal CONT provided from the microcontroller 220.

Figure 5:
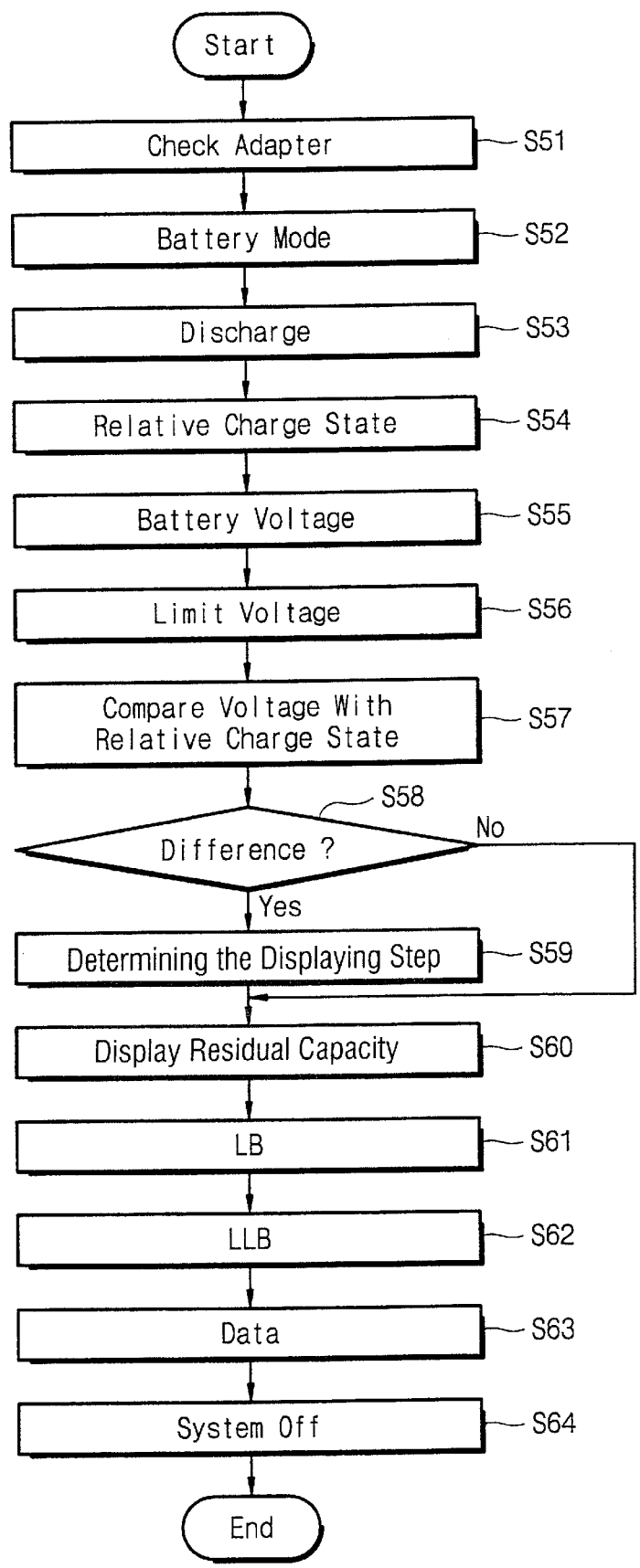
FIG. 5 is a flow chart illustrating a process for displaying an actual state of residual capacity information of a smart battery according to a preferred embodiment of the present invention.

FIG. 5 is a flow charge showing a process to display an actual residual capacity of the smart battery according to an operation of the first and second embodiments in the present invention. The process is a program performed in the microcontroller 110 or 220, and stored in a memory (not shown) formed in the microcontroller 110 or 220.

Referring to FIG. 5, the microcontroller 110 or 220 checks whether the AC adapter is installed or not at step S51. In case the AC adapter is not installed, a battery mode in which the power supply voltage of the portable electronic device is supplied from the smart battery starts at step S52, and a battery discharge starts at step S53.

Afterwards, at step S54, the RSOC is detected from the smart battery, and then the battery voltage $V_{DET}$ is detected at step S55. At step S56, it is determined whether the detected voltage $V_{DET}$ is identical with either of an LB limit voltage and an LLB limit voltage. The computer (particularly, the microcontroller 110) is provided with a limit voltage table in which a plurality of limit voltages are stored. The limit voltage table includes a plurality of LB limit voltages and a plurality of LLB limit voltages depending on battery temperature, discharge current, battery life cycle (or the number of charge/discharge operations of the battery), etc. The microcontroller 110 selects one LB limit voltage (e.g., 9V) and one LLB limit voltage (e.g., 8.5V) from the limit voltage table depending on the battery temperature, discharge current, battery life cycle, etc. In other words, if the battery output voltage $V_{DET}$ is identified in the LB state period by detecting whether the battery output voltage $V_{DET}$ is in a period of the LB or LLB state, the detected voltage $V_{DET}$ and the RSOC are compared with each other at step S57. At step S58, with the result of the comparison, if two information values RSOC and $V_{DET}$ are different, the process progresses to next step S59 to determine a step for displaying the battery residual capacity information. In other words, if the battery state is in a state that affects an operation of the system, the battery residual capacity information is controlled to be displayed by using the detected voltage $V_{DET}$. Then, if the voltage reaches below the LB level, the battery residual capacity information is controlled to be displayed by using the RSOC. At step S60, the battery residual capacity information is displayed on the LED or LCD device according to the determined displaying step. In case there is no difference between the $V_{DET}$ and the RSOC, either of them may be used to display the battery residual capacity information.

Afterwards, the microcontroller 110 or 220 identifies a voltage point of the LB at step S61. The LLB voltage is detected at step S62. If the LLB voltage is detected, the present data being processed is stored in the hard disk drive at step S63, and then the system is turned off at step S64.

Figure 6:
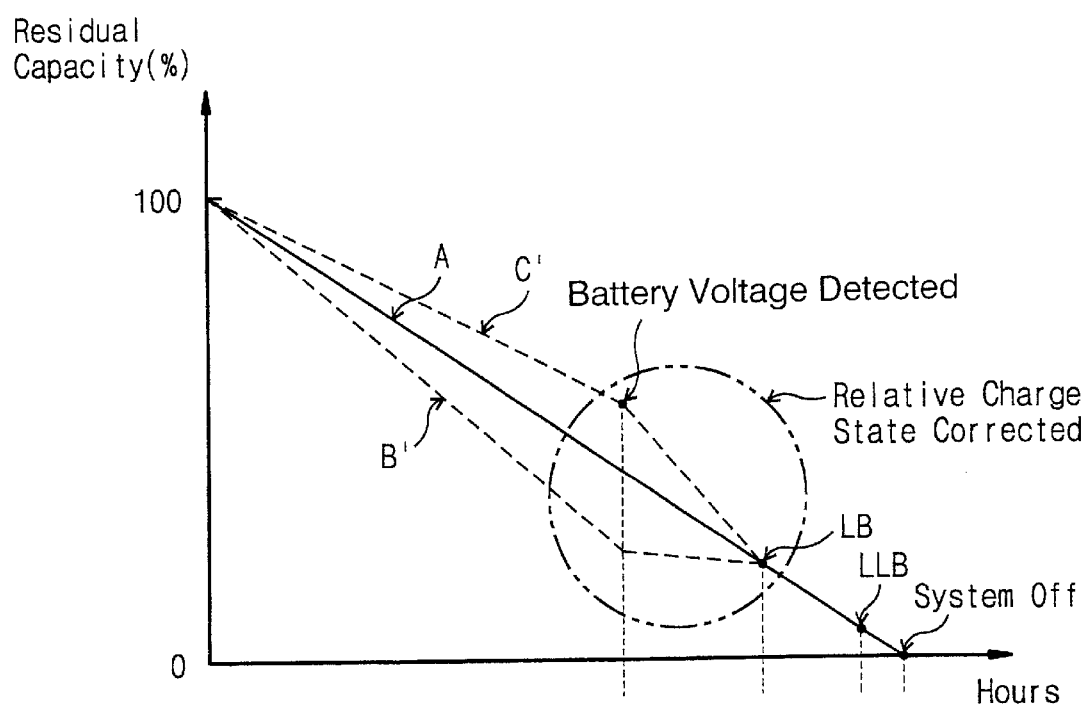
FIG. 6 is a graphic diagram illustrating a discharge characteristic according to the process for displaying residual charge capacity information corrected in accordance with a preferred embodiment of the present invention.
Figure 7:
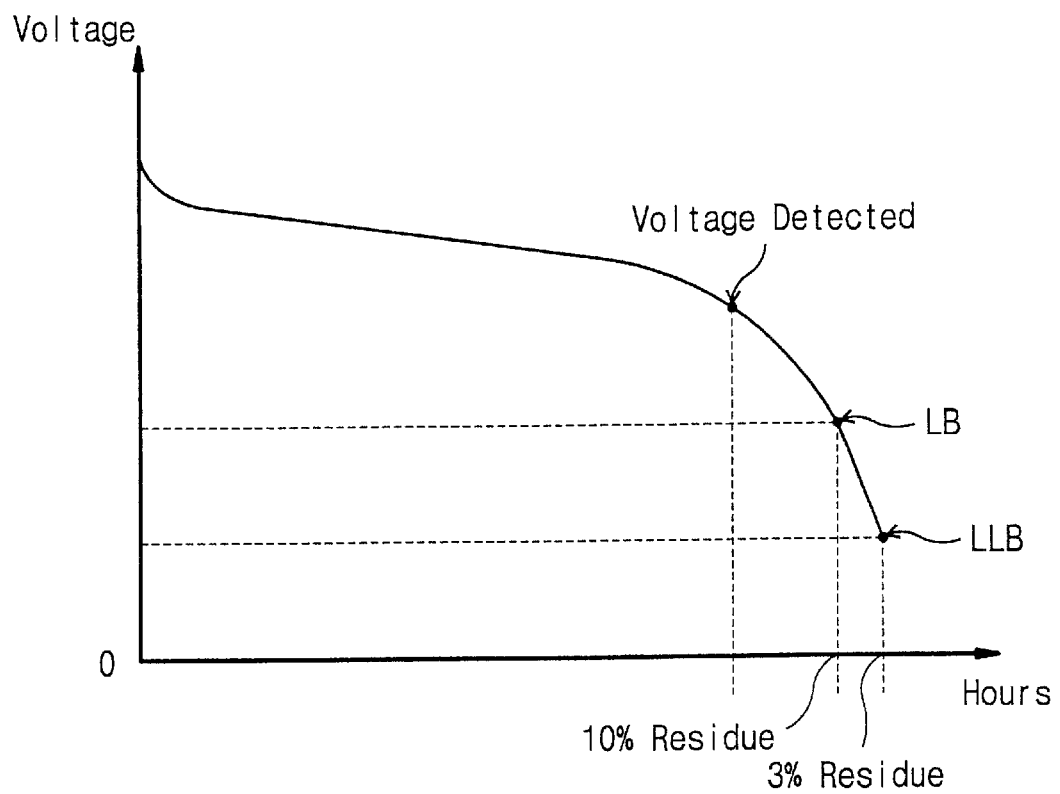
FIG. 7 is a graphic diagram illustrating a discharge characteristic according to a preferred embodiment of the present invention.

FIGS. 6 and 7 show characteristics of an actual discharge and a discharge feature according to the corrected method for displaying the residual capacity information of the present invention. Curves shown in FIG. 6 show that the microcontroller 110 or 220 corrects the battery residual capacity information with a specific voltage by using the RSOC and the detected voltage $V_{DET}$ from the smart battery, in view of the discharge curve shown in FIG. 7.

Referring to FIGS. 6 and 7, the microcontroller 110 or 220 controls the device to display the battery residual capacity information by receiving the RSOC before the battery voltage is detected, after the battery discharge starts. From a detection of the battery voltage to the LB state, the RSOC and the detected voltage $V_{DET}$ are compared with each other, and then, if the two information values RSOC and $V_{DET}$ are different, the microcontroller 110 or 220 controls the device to display the battery residual capacity information by correcting the difference, i.e., using the detected voltage $V_{DET}$. Afterwards, from the LB state to the LLB state, the microcontroller 110 or 220 controls the device to display the battery residual capacity information by receiving the RSOC. Stated another way, assuming just for example sake, the (first) low battery period is in a residual capacity state of 15 to 20% of full charge capacity of the battery, and the (second) low low battery period is in a residual capacity state of 3 to 10% of the full charge capacity of the battery from the detection of the battery voltage. Then from a detection of the battery voltage down to and including the period of low battery state (i.e. from greater than 20% down to and including 15% of full charge capacity), the RSOC and the detected voltage are compared and if they are different, the detected voltage $V_{DET}$ is used. Further, from the period of the LB state and down to and including the LLB state period (i.e. from less than 15% down to and including 3% of the full charge capacity of the battery), the microcontroller 110 or 220 controls the device to display the battery residual capacity information by using the RSOC. The LB state can be preferably defined as a residual capacity state of 10 to 40% of full charge capacity of a battery. In such an LB state, a user is advised to hurry up and finish the current work. The LLB state can be preferably defined as a residual capacity state of about 3% of full charge capacity of a battery. In such an LLB state, since the battery will enter its full discharge state soon, the computer saves all the current work data in a hard disk drive (HDD) by force in order to prevent data loss and then cuts off system power supplied from the battery, regardless of user's will. In the meantime, ranges of the LB and LLB states can be adjusted on the operating system.

As the foregoing description, in a device and a method for displaying the battery residual capacity information of the portable electronic device, the exact battery residual capacity information can be displayed by correcting a difference between an actually-detected output voltage and the battery RSOC generated in a battery charge state of a low battery level.

Thus, it is possible to settle an inconvenience to perform a calibration of the battery in order to obtain an accuracy of the RSOC. Further, the present invention can prevent a system malfunction or data loss caused from inaccurately displayed battery residual capacity information.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A portable electronic device, comprising:
    a battery providing a power source to said portable electric device;
    a display unit; and
    a control unit controlling a display on said display unit of battery residual capacity information by receiving a relative state of charge from said battery, said control unit detecting an output voltage of said battery, comparing the detected voltage with the relative state of charge, and controlling said portable electronic device to display the battery residual capacity information in response to data corresponding to the output voltage when the battery is in a period of a first low battery and the detected voltage is different from the relative state of charge, said control unit controlling said portable electronic device to display the battery residual capacity information in response to the relative state of charge when the battery is in a period of a second low battery lower than the first low battery period.

2. The portable electronic device of claim 1, with the first low battery period being in a residual capacity state of 15% to 20% of a full charge capacity of said battery, and the second low battery period is in a residual capacity state of 3% to 10% of the full charge capacity of said battery.

3. The portable electronic device of claim 1, with said control unit controlling said portable electronic device to store present data being processed, and to block the power source of said portable electronic device, when the second low battery period is detected.

4. The portable electronic device of claim 1, with said control unit being formed of a microcontroller.

5. The portable electronic device of claim 1, with said control unit comprising:
    a function key for calling to display the battery residual capacity information;
    a microcontroller receiving the relative state of charge from said battery;
    a basic input/output system for controlling said portable electronic device to provide the relative state of charge to the microcontroller in response to the calling of said function key; and
    a memory including an operating system program for displaying the battery residual capacity information in response to the relative state of charge and a control provided from said microcontroller.

6. A method for displaying battery residual capacity information of a portable electronic device having a battery, the method comprising the steps of:
    receiving a relative state of charge from said battery;
    identifying whether said battery is in a period of a first low battery from the relative state of charge;
    detecting a voltage of said battery when said battery is in the first low battery period;
    comparing the detected voltage with the relative state of charge;
    controlling said portable electronic device to display the battery residual capacity information by using data corresponding to the detected voltage, when the detected voltage is different from the relative state of charge;
    identifying whether the battery is in a period of a second low battery lower than the first low battery from the relative state of charge; and
    controlling said portable electronic device to display the battery residual capacity information by using the relative state of charge, when said battery is in the second low battery period.

7. The method of claim 6, further comprising the step of controlling said portable electronic device to store present data being processed by said portable electronic device, and to block a power source of said portable electronic device, when said battery is in the second low battery period.

8. A portable electronic device, comprising:
    a battery providing a power source to said portable electric device; and
    a control unit controlling an output of battery residual capacity information by receiving a relative state of charge from said battery, said control unit detecting an output voltage of said battery, comparing the detected voltage with the relative state of charge, and controlling said portable electronic device to output the battery residual capacity information in response to data corresponding to the output voltage when the battery is in a period of a first low battery and the detected voltage is different from the relative state of charge, said control unit controlling said portable electronic device to output the battery residual capacity information in response to the relative state of charge when the battery is in a period of a second low battery lower than the first low battery period.

9. The portable electronic device of claim 8, with said control unit controlling said portable electronic device to store present data being processed, and to block the power source of said portable electronic device, when the second low battery period is detected.

10. The portable electronic device of claim 8, with said control unit comprising:
    a function key for calling to output the battery residual capacity information;
    a microcontroller receiving the relative state of charge from said battery;
    a basic input/output system for controlling said portable electronic device to provide the relative state of charge to the microcontroller in response to the calling of said function key; and
    a memory including an operating system program for outputting the battery residual capacity information in response to the relative state of charge and a control provided from said microcontroller.

11. The portable electronic device of claim 8, with said control unit comprising:
    a function key for calling to output the battery residual capacity information;
    a microcontroller receiving the relative state of charge from said battery in response to the function key; and
    a memory including an operating system program for outputting the battery residual capacity information in response to the relative state of charge and a control provided from said microcontroller.

12. A method, comprising the steps of:
    receiving a relative state of charge from a battery powering an electric device;
    identifying whether said battery is in a period of a first low battery from the relative state of charge;
    detecting a voltage of said battery when said battery is in the first low battery period;
    comparing the detected voltage with the relative state of charge;
    controlling said electric device to output the battery residual capacity information by using data corresponding to the detected voltage, when the detected voltage is different from the relative state of charge;
    identifying whether the battery is in a period of a second low battery lower than the first low battery from the relative state of charge; and
    controlling said electric device to output the battery residual capacity information by using the relative state of charge, when said battery is in the second low battery period.

13. The method of claim 12, further comprising the step of controlling said electric device to store present data being processed by said electric device, and to block a power source of said electric device, when said battery is in the second low battery period.

14. A method, comprising the steps of:
    receiving a relative state of charge from a battery powering an electric device;
    detecting a battery voltage from said battery;
    comparing the detected voltage with the relative state of charge;
    identifying whether said battery is in a period of a first low battery from the relative state of charge or in a second low battery, the second low battery being lower than the first low battery;
    outputting the battery residual capacity information by using data corresponding to the detected voltage, when the detected voltage is different from the relative state of charge and during the time from the detection of the battery voltage to the detection of a first low battery from the relative state of charge; and
    outputting the battery residual capacity information by using the relative state of charge from the detection of the first low battery to the detection of a second low battery.

15. The method of claim 14, further comprising the step of controlling said portable electric device to display the battery residual information.

* * * * *